(12) United States Patent
Shimada et al.

(10) Patent No.: US 8,869,754 B2
(45) Date of Patent: Oct. 28, 2014

(54) ENGINE SYSTEM WITH REFORMER (75) Inventors: Atsushi Shimada, Hitachinaka (JP); Takao Ishikawa, Hitachi (JP); Yasuo Yoshii, Naka (JP)

(73) Assignee: Hitachi Ltd, Tokyo (JP)

( * ) Notice: Subject to any disclaimer, the term of this patent is extended or adjusted under 35 U.S.C. 154(b) by 331 days.

(21) Appl. No.: 13/388,452

(22) PCT Filed: Aug. 18, 2010

(86) PCT No.: PCT/JP2010/063930
§ 371 (c)(1),
(2), (4) Date: Feb. 2, 2012

(87) PCT Pub. No.: WO2011/040139
PCT Pub. Date: Apr. 7, 2011

(65) Prior Publication Data
US 2012/0145096 A1 Jun. 14, 2012

(30) Foreign Application Priority Data

Sep. 30, 2009 (JP) .................................. 2009-225936

(51) Int. Cl.
*F02D 19/06* (2006.01)
*F02M 25/10* (2006.01)
*F02M 27/02* (2006.01)
*F02P 5/15* (2006.01)
*F02D 19/08* (2006.01)
*F01N 5/02* (2006.01)
*F02M 25/07* (2006.01)
*F02M 33/00* (2006.01)

(52) U.S. Cl.
CPC .............. *F02M 27/02* (2013.01); *F02P 5/1502* (2013.01); *F02D 19/081* (2013.01); *F02D 19/0605* (2013.01); *F02D 19/0628* (2013.01); *Y02T 10/121* (2013.01); *F02D 19/0692* (2013.01); *F20D 9/10* (2013.01); *Y02T 10/36* (2013.01); *F02D 19/0644* (2013.01); *Y02T 10/16* (2013.01); *F02D 19/0671* (2013.01); *F01N 5/02* (2013.01); *F02M 25/0742* (2013.01); *Y02T 10/46* (2013.01); *F02D 19/0689* (2013.01); *F02M 33/00* (2013.01); *Y02T 10/126* (2013.01)
USPC .................. 123/3; 123/304; 60/671

(58) Field of Classification Search
CPC ........... F01N 5/02; C01B 3/323; C01B 3/326; F02D 41/0025; F02D 41/0065; F02D 41/0072; F02D 41/1446; F02D 19/0644; F02D 19/0671; F02M 25/0742
USPC ............................................................ 123/3
See application file for complete search history.

(56) References Cited

U.S. PATENT DOCUMENTS

| 7,412,947 B2* | 8/2008 | Shinagawa et al. ................ 123/3 |
| 2008/0202449 A1* | 8/2008 | Shimada et al. ................... 123/3 |
| 2010/0300382 A1 | 12/2010 | Yahagi et al. |

FOREIGN PATENT DOCUMENTS

| JP | 2001-271682 | 10/2001 |
| JP | 2006-170142 | 6/2006 |

(Continued)

OTHER PUBLICATIONS http://www.stfrancis.edu/content/ns/diab/CRT/Research%20presentations/Octane/%20values.ppt.*

(Continued)

*Primary Examiner* — Lindsay Low
*Assistant Examiner* — Kevin Lathers
(74) *Attorney, Agent, or Firm* — Antonelli, Terry, Stout & Kraus, LLP.

(57) ABSTRACT

An engine system with a reformer, wherein an unreformed fuel is reformed by the reformer mounted in an exhaust pipe, and wherein a reformed fuel containing hydrogen is supplied to an engine. The engine system with a reformer includes a controller which, when the hydrogen generated by the reformer is supplied to the engine, determines a target heat generation beginning timing in accordance with a load applied to an engine, an engine speed, and an air excess ratio of an air-fuel mixture, and which controls an ignition timing of the engine so that a difference between a current heat generation beginning timing and the target heat generation beginning timing of the engine is within a predetermined range.

8 Claims, 11 Drawing Sheets

(56) References Cited

FOREIGN PATENT DOCUMENTS

| | | |
|---|---|---|
| JP | 2009-047008 | 3/2009 |
| JP | 2009-144555 | 7/2009 |
| JP | 2009-203104 | 9/2009 |

OTHER PUBLICATIONS

JP Office Action for Japanese Patent Application No. 2011-534135, issued on Apr. 12, 2013.

* cited by examiner

ENGINE SYSTEM WITH REFORMER

TECHNICAL FIELD

The present invention relates to an engine system with a reformer.

BACKGROUND ART

In a system that reforms the fuel supplied to an engine using engine exhaust heat and generates, in part, hydrogen and the like, the fuel is reformed through an endothermic reaction using the engine exhaust heat, so that an improve in efficiency can be expected by recovering the exhaust heat. When hydrocarbon fuel, such as gasoline, is reformed so as to supply a reformed gas containing hydrogen to an engine, an increase in efficiency of the engine can be expected because a decrease in the pumping loss, an improvement in the combustion efficiency, and an increase in the combustion speed can be achieved. Moreover, dehydrogenation reaction is performed from hydrocarbon fuel, such as gasoline, so that the remaining hydrocarbon fuel after generating hydrogen will have a high octane number. This increases the knocking resistance, so that an improvement in the heat efficiency can be achieved by increasing the compression ratio. However, when the reformer is mounted in an exhaust pipe of an engine, the temperature of the reformer fluctuates depending on the operation conditions of the engine, and therefore the reformed amount fluctuates depending on the operation conditions. Thus, the amount of hydrogen and the amount of high-octane fuel after reforming will fluctuate. By performing the optimum engine control in response to these fluctuations, the heat efficiency can be increased.

As the conventional engine system with a reformer, for example, as described in Patent Literature 1, there is a technique, wherein a sensor is provided in the reformed gas and whereby the hydrogen concentration of the reformed gas is detected.

CITATION LIST

Patent Literature

PATENT LITERATURE 1 JP-A-2009-203104

SUMMARY OF INVENTION

Technical Problem

The system described in Patent Literature 1 includes a unit configured to detect the hydrogen concentration of the reformed gas. When the ignition timing is controlled based on the hydrogen concentration that is measured by the hydrogen concentration detection unit, there is a response delay, resulting in a reduction in the heat efficiency. The unit configured to detect the hydrogen concentration may receive interference from gases other than hydrogen, which may degrade the control precision of the optimum ignition timing. Moreover, when the ignition timing is varied in accordance with the hydrogen concentration, there is a need to have ignition-timing modification map data corresponding to the hydrogen concentration in addition to the conventional map control, and therefore there is a problem that the development man-hours and the amount of map data implemented in the engine system will increase.

When the reformed gas contains a high-octane fuel, the octane number of the fuel supplied to the engine will fluctuate with a change in the stored amount of the high-octane fuel. When the octane number fluctuates, the conventional idea is that in order to prevent knocking, the engine configuration is determined in accordance with the fuel having a small octane number. However, in this case, there is a problem that the compression ratio of the engine decreases and thus the improvement in the heat efficiency of the engine decreases when the fuel is a high-octane fuel.

The present invention has been made in view of the above circumstances, and provides an engine with a reformer mounted in an exhaust pipe, wherein engine combustion is performed with high efficiency with respect to a composition change of a reformed gas.

Solution to Problem

An engine system with a reformer of the present invention is the engine system with a reformer, wherein an unreformed fuel is reformed by the reformer mounted in an exhaust pipe, and wherein a reformed fuel containing hydrogen is supplied to an engine. The engine system with a reformer includes a controller which, when the hydrogen generated by the reformer is supplied to the engine, determines a target heat generation beginning timing in accordance with a load applied to an engine, an engine speed, and an air excess ratio and which controls the ignition timing of the engine so that a difference between a current heat generation beginning timing and the target heat generation beginning timing of the engine is within a predetermined range.

The engine system with a reformer of the present invention comprises: a separation unit separating the reformed fuel into a hydrogen gas and a dehydrogenation fuel; a hydrogen gas supply unit supplying the hydrogen gas to an intake pipe of the engine; a tank storing the dehydrogenation fuel; and a dehydrogenation fuel supply unit directly injecting the dehydrogenation fuel into the engine.

Advantageous Effects of Invention

According to the present invention, in an engine system with a reformer having the reformer mounted in an exhaust pipe, the engine combustion can be performed with high efficiency with respect to a composition change of the reformed gas.

The other objects, features, advantages of the present invention become clear from the following description of the embodiments of the present invention in conjunction with the accompanying drawings.

DESCRIPTION OF EMBODIMENTS

Hereinafter, the embodiments of the present invention will be described using the accompanying drawings.

Embodiment 1

Figure 1:
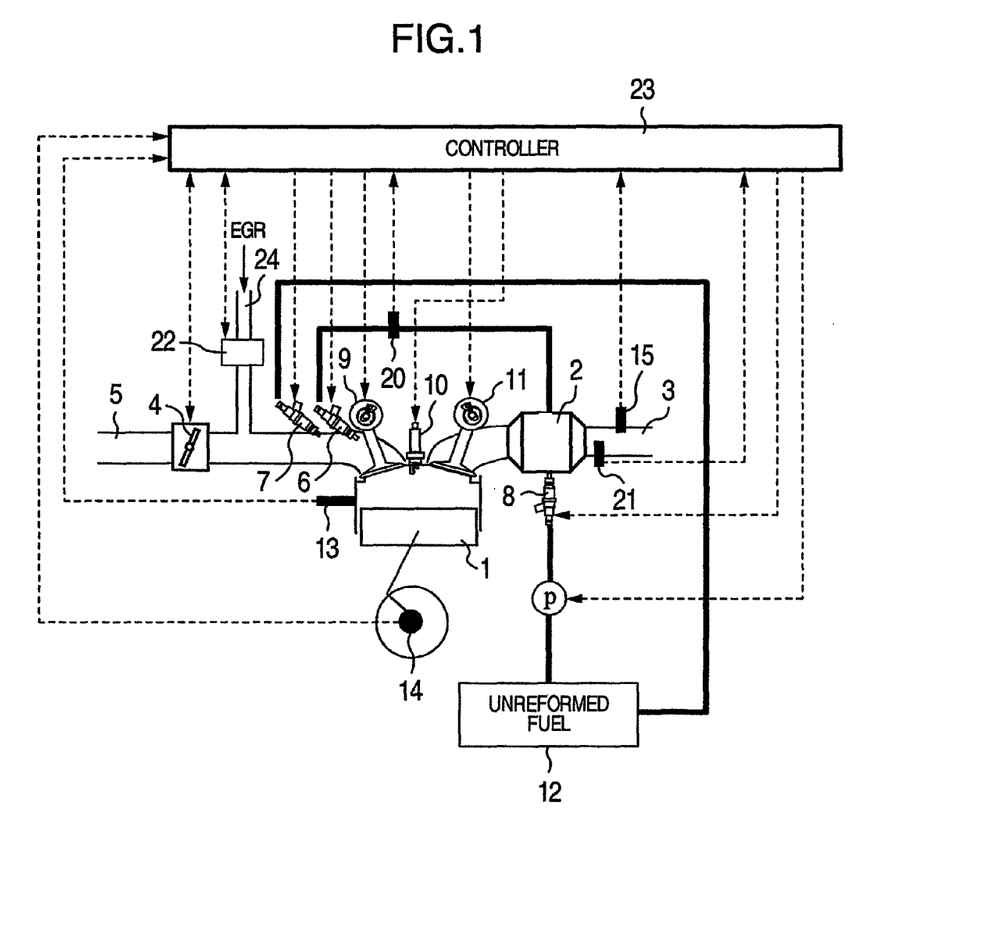
FIG. 1 shows a block diagram of a first embodiment of an engine with a reformer to which the present invention is applied.

FIG. 1 is a block diagram of a first embodiment of this system. In the configuration of the embodiment, a reformed fuel reformed by a reformer 2 installed in an engine exhaust pipe 3 is supplied to an engine 1. For example, if an unreformed fuel is gasoline, then in the case of $C_8H_{18}$ (normal octane) that is one composition in gasoline, a steam reforming reaction as expressed by Reaction Formula (1) below can be carried out.

$$C_8H_{18}+8H_2O => 17H_2+8CO-1303 \text{ kJ} \qquad \text{Reaction Formula (1)}$$

It can be seen that because the above-described reforming reaction is an endothermic reaction and the hydrogen in steam can be used as the fuel, the heat generation amount of the reformed fuel increases by 1303 kJ relative to the unreformed fuel. Because the heat generation amount of the unreformed fuel is 5075 kJ and that of the reformed fuel is 6378 kJ, the heat generation amount of the reformed fuel improves by 25.7% relative to the unreformed fuel. That is, this means that the heat efficiency on the basis of $C_8H_{18}$ improves by 25.7% due to the reforming reaction.

In this system, the reformer 2 is installed in the exhaust pipe 3 of the engine 1. An unreformed fuel 12 is supplied to the reformer 2 via a pump p and a fuel supply system 8. In the reformer 2, the unreformed fuel is reformed using the heat of exhaust gas of the engine. The reformed fuel is supplied from the fuel supply system 6 to an intake pipe of the engine 1. Moreover, a pressure sensor 20 measuring the pressure of a supply line is installed in the supply line of the reformed fuel. A temperature sensor 21 measuring the temperature of exhaust gas is installed at the outlet of the reformer 2. Moreover, the reformer 2 can directly supply the unreformed fuel 12 from the fuel supply system 7 to the intake pipe of the engine 1 in accordance with the operation conditions of the engine before warm-up, for example. One end of an EGR pipe 24 is coupled to an intake pipe 5. The other end of the EGR pipe 24 is coupled to the exhaust pipe. An EGR amount can be controlled by controlling the opening/closing of an EGR valve 22 arranged in the middle of the EGR pipe 24. The reformer 2 may be installed in the EGR pipe so that the reformed fuel is supplied to the intake pipe together with an EGR gas. Installed in the combustion chamber of the engine 1 is a pressure sensor 13, with which the pressure inside the engine 1 is measured. Moreover, a rotational position detection device 14 is installed in a crankshaft of the engine 1, and is capable of determining the rotation angle of the crank. The rotational position detection device 14 may be mounted in a cam shaft.

A controller 23 is a computer, for example, and as shown in FIG. 1, receives signals from various sensors or detection devices, and also outputs signals for driving devices, such as an intake valve 10, an exhaust valve 11, a throttle valve 4, an ignition plug 10, the fuel supply systems 6, 7, and 8, and the fuel pump p. The controller 23, based on an input signal, generates and outputs a driving signal to an actuator driving the above-described device, according to a predetermined program to perform a control flow to be described later.

Figure 2:
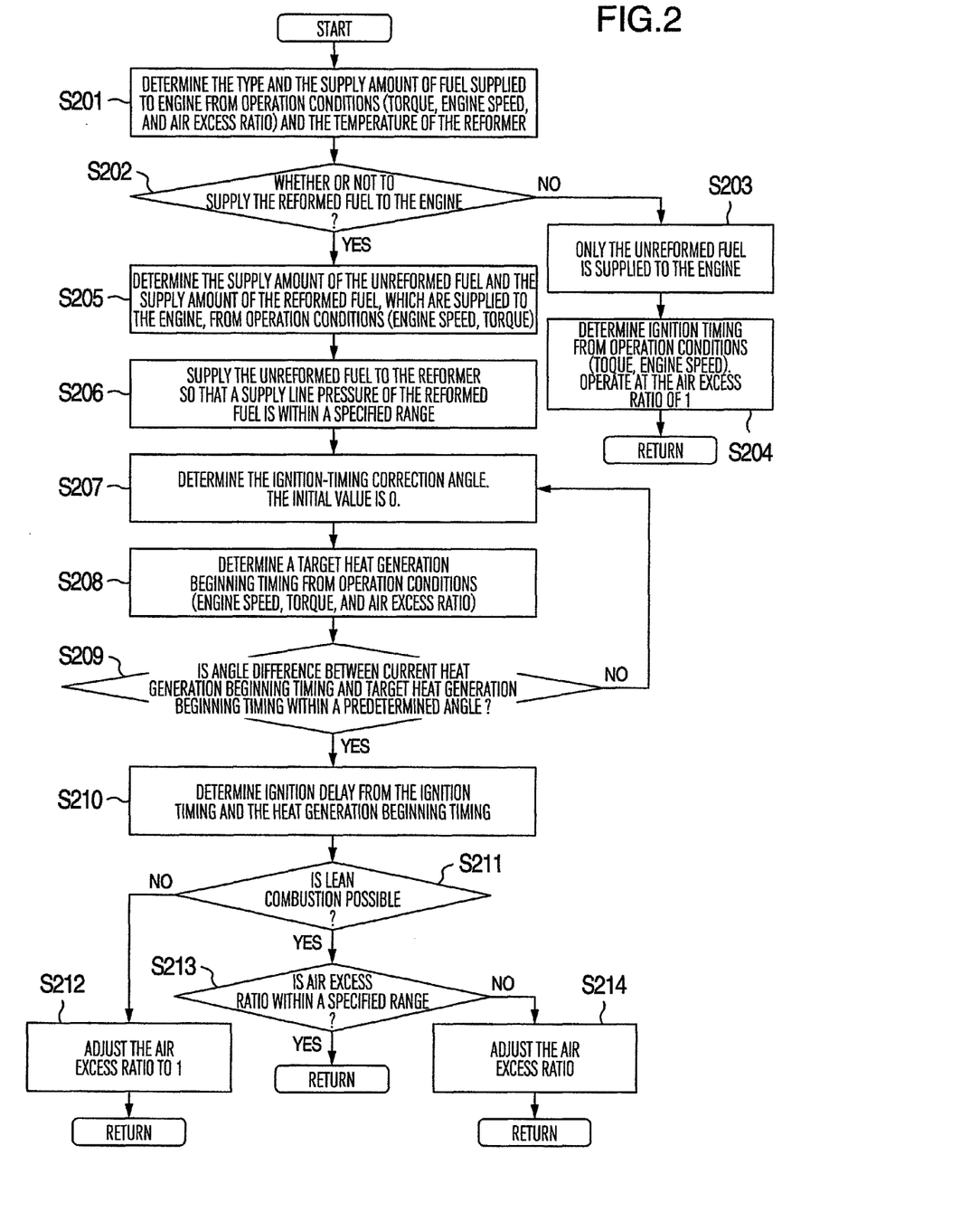
FIG. 2 shows a control flow in the first embodiment.
Figure 3:
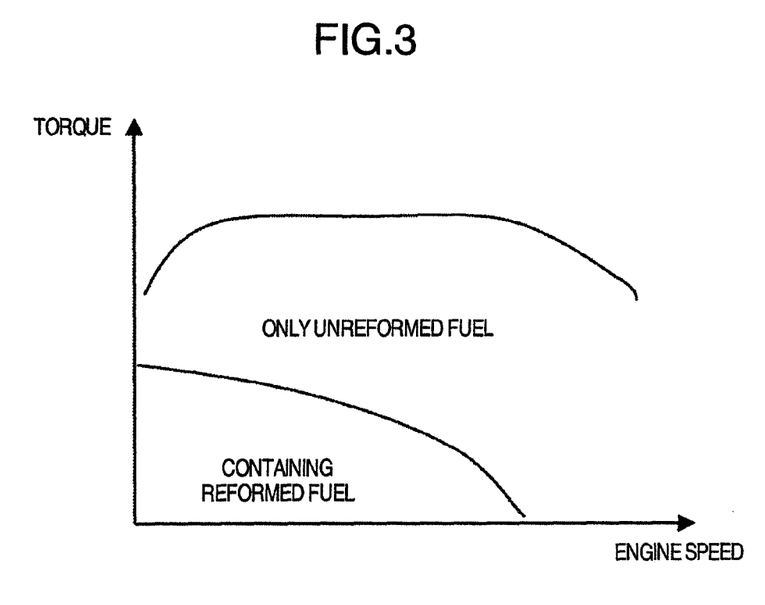
FIG. 3 shows a fuel supply map in the first embodiment.
Figure 4:
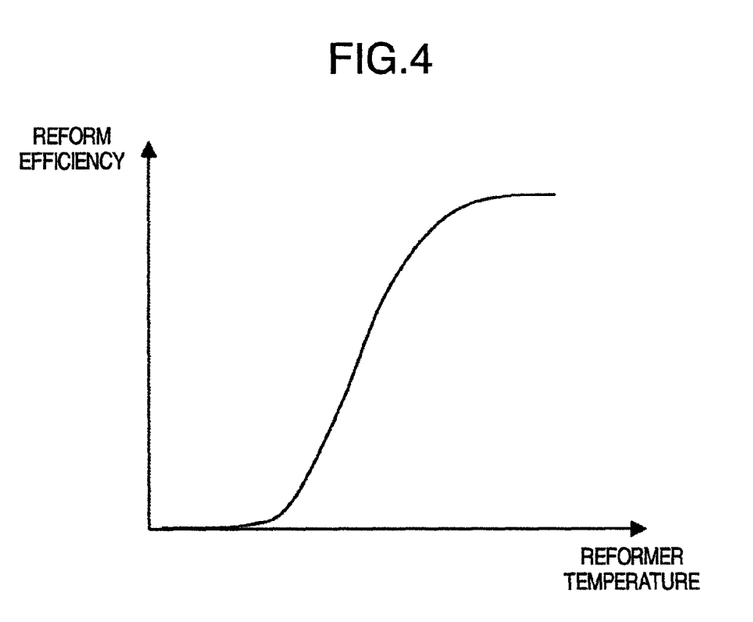
FIG. 4 shows a relationship between the reformer temperature and the reform efficiency in the first embodiment.

FIG. 2 shows a control flow diagram of the system of FIG. 1. In S201, the type and the supply amount of the fuel supplied to an engine are determined from the operation conditions, such as the torque of the engine, the engine speed, and the air excess ratio, and the temperature of the reformer 2. The torque is measured by means of a torque sensor in the crank shaft, or is estimated from the measurement values of the intake pipe negative pressure and the opening degree of the throttle valve 4. The temperature of the reformer 2 is determined from the temperature of the exhaust gas in the outlet of the reformer measured by the temperature sensor 21. FIG. 3 shows a map of the fuel supplied to the engine 1 with respect to the engine speed and the torque. Because the reformed fuel is assumed to contain hydrogen, it is supplied in a relatively low load region and a low engine speed region of the engine. Because hydrogen can undergo lean and rapid combustion, supplying the reformed fuel in a low load region of the engine makes it possible to improve the heat efficiency due to a reduction in the pumping loss and an improvement in the degree of constant volume. On the other hand, if on a high load side, hydrogen is supplied, in part, as the fuel, then the combustion speed is too fast and therefore the cooling loss increases and the heat efficiency conversely degrades. Moreover, because supplying hydrogen reduces the maximum suction air amount, an operation without supplying hydrogen is preferable on the high load side. FIG. 4 shows a relationship between the reformer temperature and the reform efficiency of the reformer 2 in the reforming reaction in the case of the Reaction Formula (1). As shown in FIG. 4, it can be seen that the reformer temperature equal to or greater than a predetermined temperature improves the reform efficiency, allowing for reforming of the fuel. For this reason, when the temperature of the reformer is lower than the predetermined temperature even if supplying the reformed fuel is preferable judging from the engine speed and the torque, the unreformed fuel is supplied to the engine.

From the type and the supply amount of the fuel supplied to the engine that are determined in S201, it is determined in S202 whether or not to supply the reformed fuel to the engine.

If the reformed fuel is not supplied to the engine in S202, only the unreformed fuel is supplied to the engine in S203 and the ignition timing is determined from the operation conditions of the engine in S204. The control is made based on the output of an $O_2$ sensor 15 of the exhaust pipe so that the air excess ratio of an air-fuel mixture with respect to the engine becomes 1.

Figure 5:
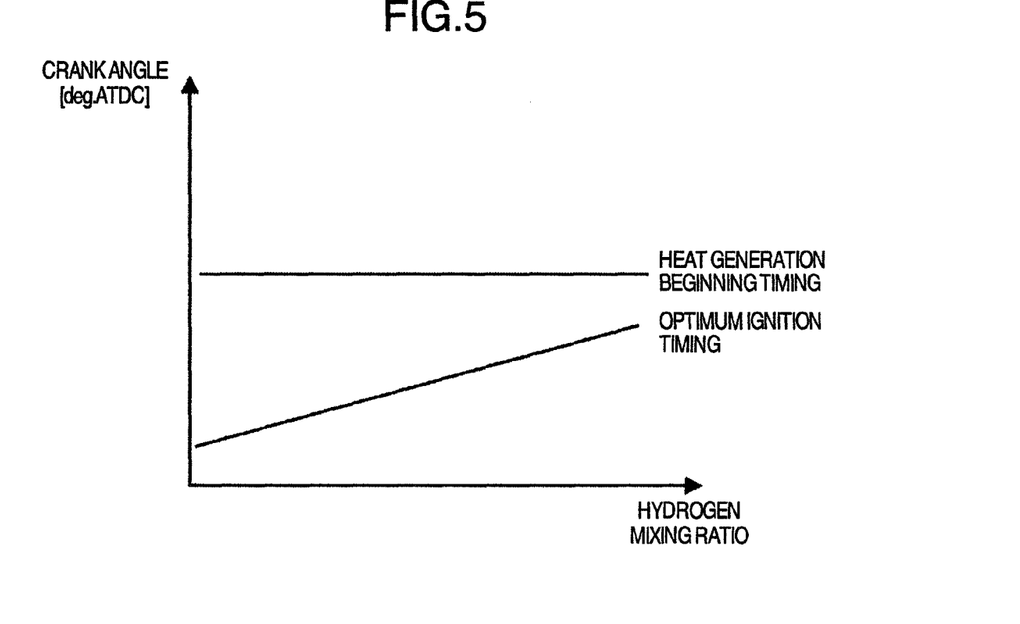
FIG. 5 shows a relationship between a hydrogen mixing ratio and the optimum ignition timing as well as a heat generation beginning timing.
Figure 6:
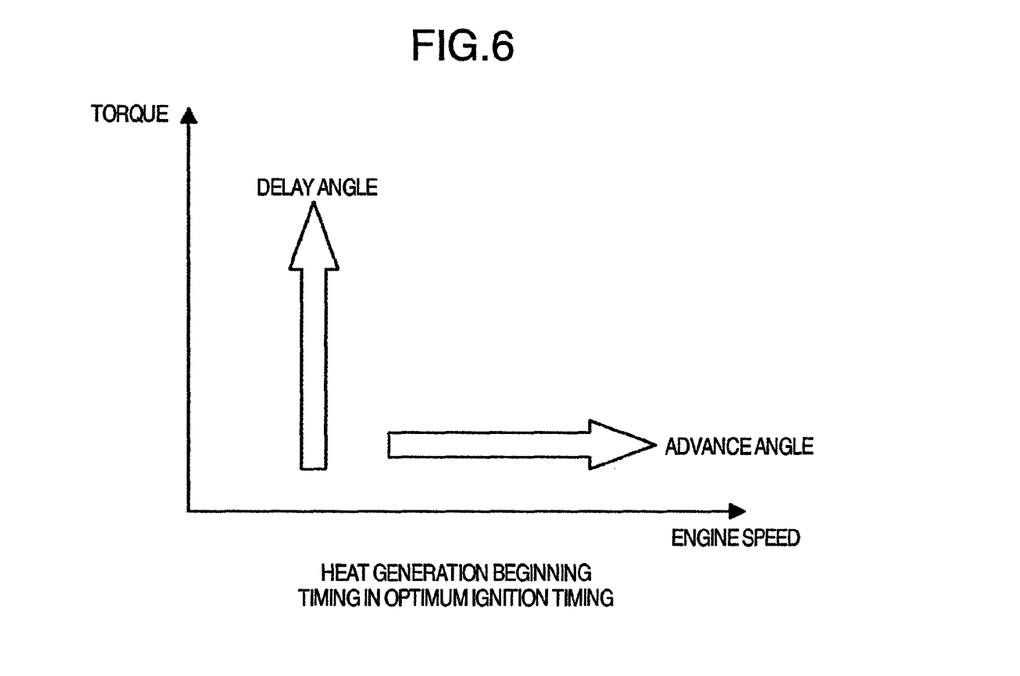
FIG. 6 shows a heat generation beginning timing map in the optimum ignition timing.
Figure 7:
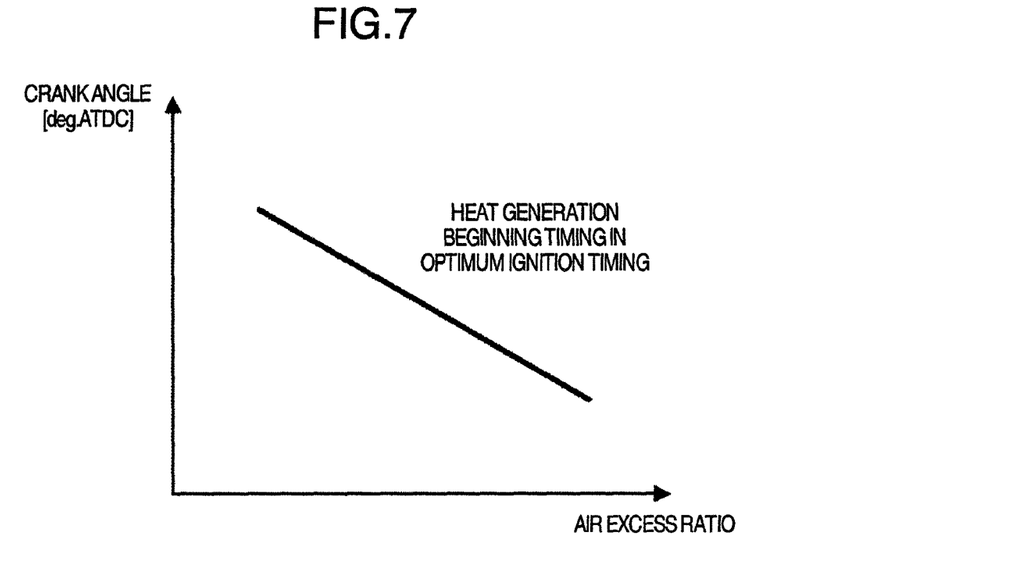
FIG. 7 shows the heat generation beginning timing in the optimum ignition timing versus an air excess ratio.

If it is determined in S202 that the reformed fuel is supplied to the engine, then in S205 the supply amount of the unreformed fuel and the supply amount of the reformed fuel supplied to the engine are determined from the operation conditions of the engine, and the unreformed fuel and the reformed fuel are supplied to the engine. In S206, in order to stabilize the supply amount of the reformed fuel, the supply amount of the unreformed fuel to the reformer 2 is controlled so that a supply line pressure of the reformed fuel measured by the pressure sensor 20 becomes constant. Next, an ignition-timing correction angle is determined in S207. Note that the initial value of the ignition-timing correction angle is 0. A target heat generation beginning timing corresponding to the engine speed, the torque, and the air excess ratio is determined in S208. For the target heat generation beginning timing, the data of the heat generation beginning timing in the optimum ignition timing (MBT) corresponding to the torque, the engine speed, and the air excess ratio is obtained in advance, and the target heat generation beginning timing is determines from this data. This data is stored in a database of the controller in advance. FIG. 5 shows a relationship among a hydrogen mixing ratio in the fuel supplied to the engine 1 under the constant conditions of the torque of the engine, the engine speed, and the air excess ratio, the optimum ignition timing (MBT) at which the maximum torque is generated, and the heat generation beginning timing when ignited at the MBT. As shown in FIG. 5, as the hydrogen mixing ratio increases, the optimum ignition timing tends to delay. On the other hand, the heat generation beginning timing does not depend on the hydrogen mixing ratio. This characteristic implies that by determining the ignition timing so that the heat generation beginning timing becomes constant even when the hydrogen mixing ratio is unknown, the operation at MBT is possible. Note that, the heat generation beginning timing in MBT varies with the torque, the engine speed, and the air excess ratio, as shown in FIG. 6 and FIG. 7. FIG. 6 shows the heat generation beginning timing in MBT with respect to the engine speed and the engine torque. The higher the engine speed, the earlier the heat generation beginning timing in the optimum ignition timing tends to become, and the larger the engine torque, the later the heat generation beginning timing in the optimum ignition timing tends to become. As shown in FIG. 7, with respect to the air excess ratio, the larger the air excess ratio, the earlier the heat generation beginning timing tends to become. For this reason, the heat generation beginning timing in MBT corresponding to the torque, the engine speed, and the air excess ratio is obtained in advance as data, and the target heat generation beginning timing is determined from this data. Moreover, when the EGR ratio varies, the target heat generation beginning timing is determined so that the higher the EGR ratio, the earlier the target heat generation beginning timing becomes, and on the contrary, so that the lower the EGR ratio, the later the target heat generation beginning timing becomes.

In S209, the current heat generation beginning timing is compared with the target heat generation beginning timing to obtain the difference, and whether this difference is within a predetermined range is determined. For the current heat generation beginning timing, a pressure P and a volume V and a crank angle θ in an engine combustion chamber can be determined by means of the pressure sensor 13 and the rotational position detection device 14. Substituting these values into Formula (1) below, the rate of heat generation dQ/dθ is calculated.

$$\frac{dQ}{d\theta} = \left(\frac{1}{K-1}\right) V \frac{dP}{d\theta} + \left(\frac{K}{K-1}\right) P \frac{dV}{d\theta} \qquad (1)$$

Where K is a ratio of specific heat. Formula (1) of the heat generation is an apparent rate of heat generation, and does not include the heat quantity of cooling loss. However, this has nothing to do with the heat generation beginning timing. K may be calculated as a constant value. An instant when the rate of heat generation becomes positive is defined as the heat generation beginning timing. Moreover, an instant when the gradient of the rate of heat generation becomes positive may be defined as the heat generation beginning timing. In S209, the current heat generation beginning timing is compared with the target heat generation beginning timing to obtain the difference, and if this difference is equal to or greater than a predetermined value, then ignition-timing correction is made in S207.

Figure 8:
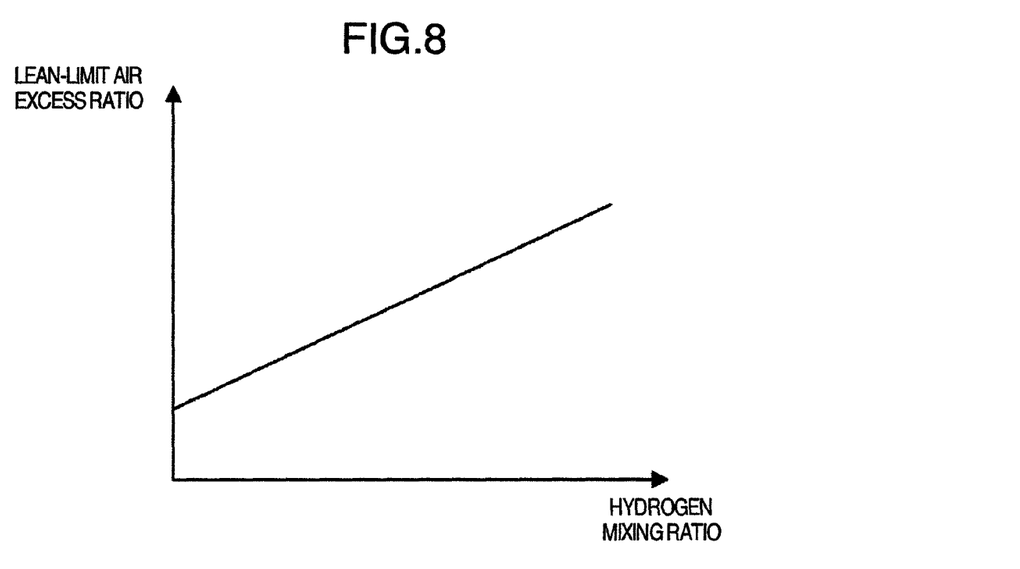
FIG. 8 shows the hydrogen mixing ratio and a lean-limit air excess ratio.
Figure 9:
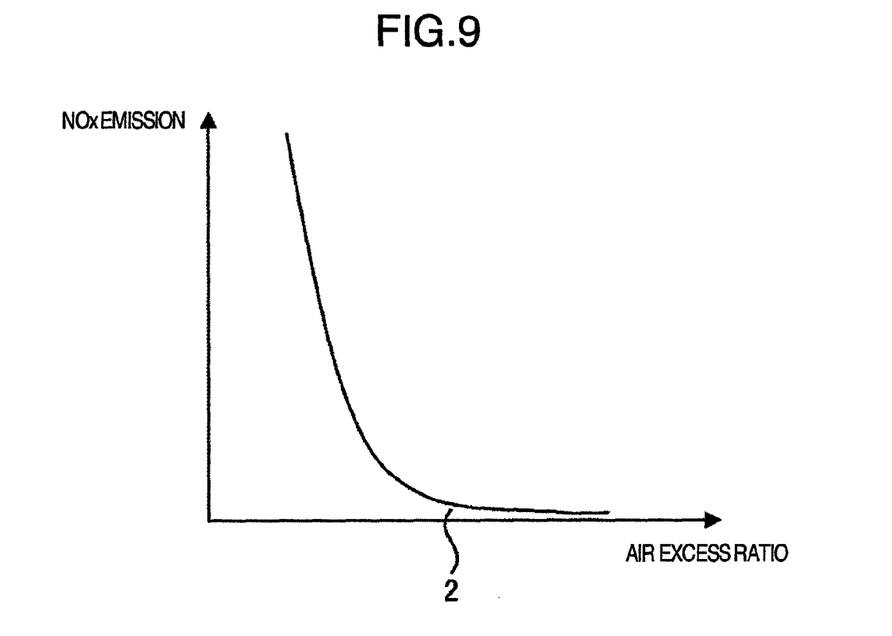
FIG. 9 shows the air excess ratio and NOx emission.

In S209, the current heat generation beginning timing is compared with the target heat generation beginning timing to obtain the difference, and if this difference is within the predetermined value, then in S210, an ignition delay is determined from the ignition timing and the heat generation beginning timing. The ignition delay is the crank angle from the ignition timing to the heat generation beginning timing. FIG. 5 reveals that the ignition delay linearly decreases with an increase in the hydrogen mixing ratio. On the basis of this characteristic, the hydrogen mixing ratio in the fuel supplied to the engine can be estimated from the ignition delay determined in S210. From the estimated hydrogen mixing ratio, it is determined in S211 whether or not lean combustion is possible. FIG. 8 shows a relationship between the hydrogen mixing ratio in the fuel and the lean-limit air excess ratio. It can be seen that the lean-limit air excess ratio linearly increases with an increase in the air excess ratio in this manner. FIG. 9 shows a relationship between the air excess ratio and the NOx emission from the engine. In this manner, with respect to an increase in the air excess ratio, NOx emission tends to decrease with a drop in the combustion temperature. Typically, at the vicinity of the air excess ratio of 2, NOx emission becomes a level at which no NOx is emitted. On the other hand, during lean combustion, NOx purification using a three-way catalyst is difficult. That is, it is determined whether or not the engine can be driven with the lean-limit air excess ratio equal to or greater than 2 and with the hydrogen mixing ratio that is estimated in S210 from the NOx emission characteristic, and if the engine can be driven with the lean-limit air excess ratio equal to or greater than 2, then it is determined in S211 that lean combustion is possible. Next, it is determined in S213 whether or not the air excess ratio is within a predetermined range, and if it is outside the predetermined range, then the air excess ratio is set to a predetermined value by adjusting the opening ratio of the throttle 4. If it is determined in S211 that the lean combustion is impossible, then in S212, the opening ratio of the throttle 4 is adjusted so that the air excess ratio becomes 1. This control flow makes it possible to drive the engine in the optimum combustion taking into account the exhaust performance in supplying the fuel containing hydrogen that is generated from the reformer 2, and makes it possible to improve the heat efficiency.

This system makes it possible to control the ignition timing of an engine even when the hydrogen concentration of the reformed fuel is unknown, thus eliminating a need for a hydrogen concentration detection unit, such as a sensor. Moreover, because the ignition timing is controlled from the heat generation beginning timing of an engine, the control for each cycle is possible and a high precision control is possible at the optimum ignition timing when the hydrogen concentration varies. Furthermore, because the ignition timing is controlled from the heat generation beginning timing of an engine, there is no need to implement an ignition map determined by the hydrogen concentration, thus resulting in a reduction in the development man hours and the amount of map data implemented in the system.

Embodiment 2

Figure 10:
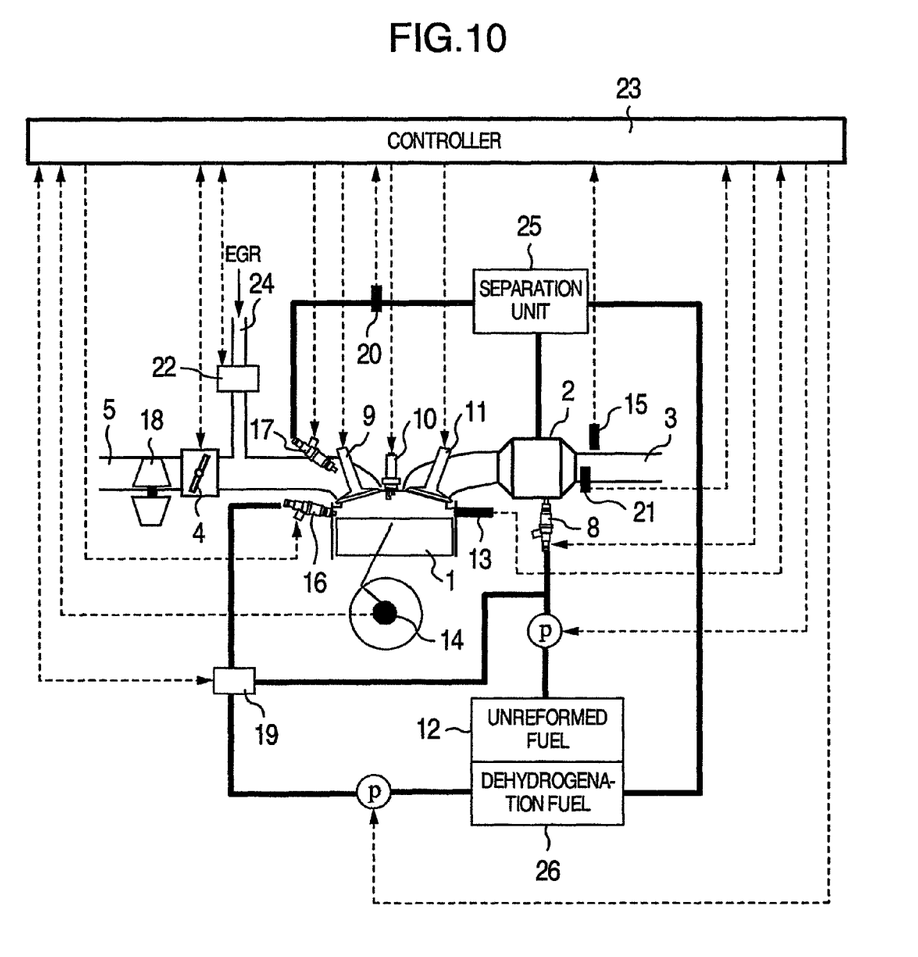
FIG. 10 shows a block diagram of a second embodiment of the engine with a reformer.

FIG. 10 shows a second block diagram of this system. In the embodiment, the reformed fuel reformed by the reformer 2 is separated into gas and liquid by a separation unit 25, which are then supplied to the engine 1. The unreformed fuel in this configuration is methylcyclohexane ($C_7H_{14}$), and the reforming reaction can be expressed by Reaction Formula (2) below.

$$C_7H_{14} \rightarrow C_7H_8 + 3H_2 \qquad \text{Reaction Formula (2)}$$

Figure 11:
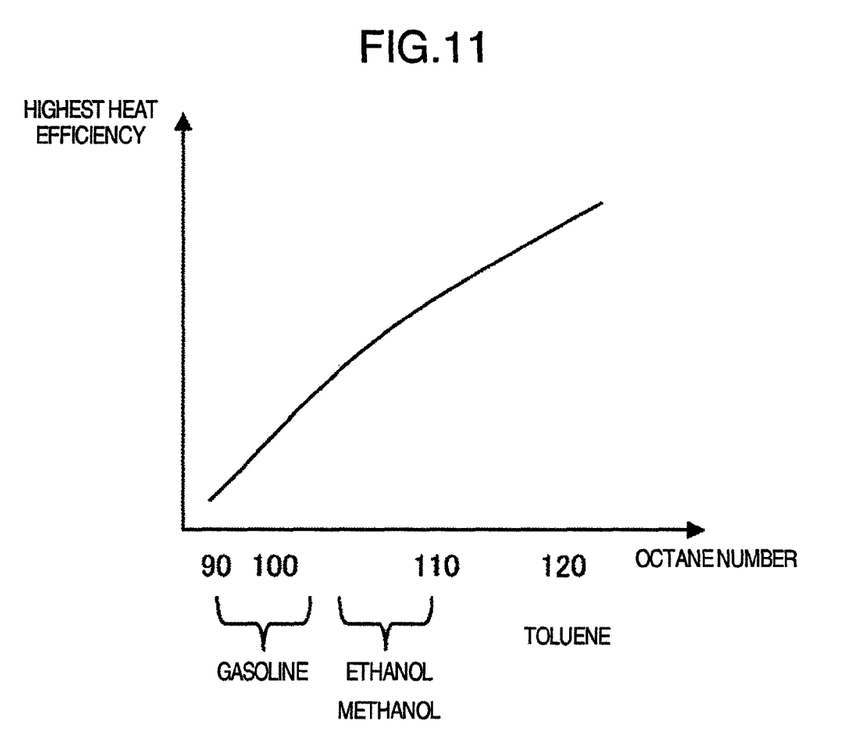
FIG. 11 shows a relationship between an octane number and the highest heat efficiency.

The reformed fuel comprises toluene ($C_7H_8$) and hydrogen ($H_2$). Reaction Formula (2) requires a heat quantity of 205 kJ, and this heat quantity is the exhaust heat recovery quantity. Moreover, because the octane number of toluene is as high as 120, the knocking resistance is high and the engine can be driven with a high compression ratio and thus the heat efficiency can be improved. FIG. 11 shows a relationship between the octane number and the highest heat efficiency. As shown in FIG. 11, the higher the octane number of fuel, the more the highest heat efficiency can be improved. This is because the higher the octane number, the more unlikely the knocking occurs, and an increase in the compression ratio and an advance in the ignition timing are possible and the highest heat efficiency can be improved.

The unreformed fuel 12 is supplied from the fuel supply system 8 to the reformer 2. In the reformer 2, the unreformed fuel 12 is reformed using the heat of the exhaust gas of the engine. Hydrogen and toluene that are the reformed fuels reformed by the reformer 2 are separated into gas and liquid by the separation unit 25. The hydrogen separated by the separation unit 25 is supplied to the intake pipe 5 of the engine 1 via the fuel supply system 17, while toluene is returned to a dehydrogenation fuel tank 26 and is then directly injected via the pump p into the combustion chamber of the engine 1 by the fuel supply system 16. Moreover, the unreformed fuel can be also supplied to the engine 1 by switching a selector valve 19. A switching control signal for the selector valve 19 is supplied from the controller 23.

The intake pipe 5 of the engine 1 includes a compressor 18 for increasing the intake pressure. The compressor 18 may use the exhaust energy of the engine or may use a power shaft of the engine.

Figure 12:
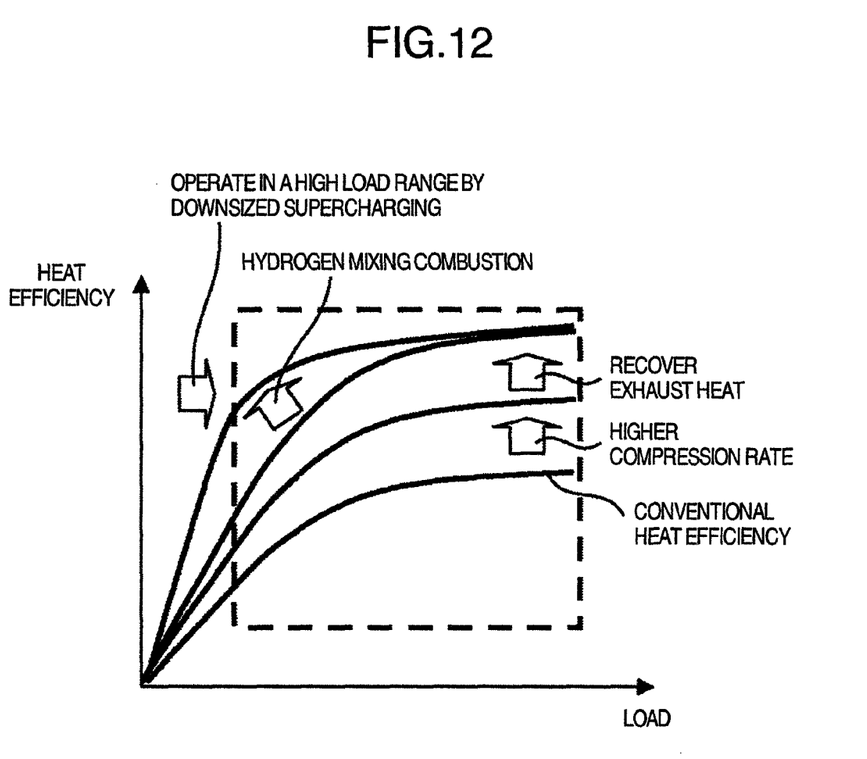
FIG. 12 shows an improvement in the heat efficiency in the second embodiment.

This system configuration allows for a highly efficient operation in a wide load range. FIG. 12 shows the heat efficiency versus load. Use of toluene that is the reformed fuel allows for the operation at a high compression ratio, thus improving the efficiency in all the load regions relative to the conventional heat efficiency. Moreover, because the reaction shown in Reaction Formula (2) is performed using the exhaust heat, the exhaust heat recovery is possible. The exhaust heat recovery makes it possible to reduce the fuel consumption and improve the efficiency. Moreover, the heat efficiency is improved by supplying hydrogen that is the reformed gas to the engine. Notably, in a low load region (in the vicinity of BMEP from 0.2 to 0.5), an improvement in the heat efficiency is significant. Moreover, by reducing the engine swept volume and using the compressor 18, the frequency of use in a low load region will decrease and the average heat efficiency will improve. Because the dehydrogenation fuel or the unreformed fuel is directly injected into an engine cylinder as shown in FIG. 10, the temperature decreases due to evaporative latent heat and the compression ratio can be set high also during supercharging by the compressed air. The reformed fuel has a high octane number, and therefore this is also a cause of being able to set the compression ratio high during supercharging. Because direct injection of the reformed fuel into the engine 1 increases the knocking resistance, the knocking will not occur even under the conditions that the charging pressure is high, thus allowing for operation with high heat-efficiency.

Figure 13:
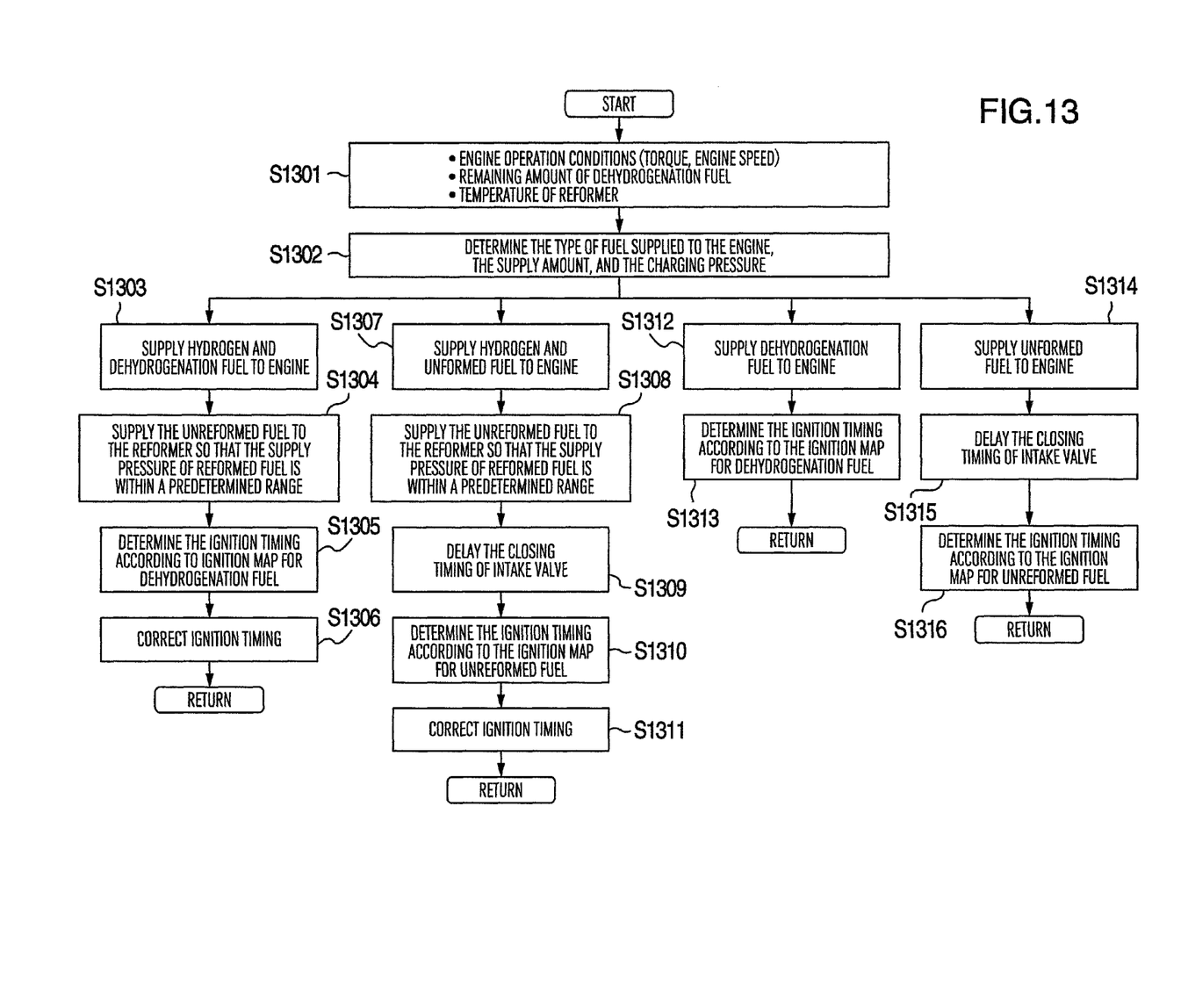
FIG. 13 shows a control flow in the second embodiment.
Figure 14:
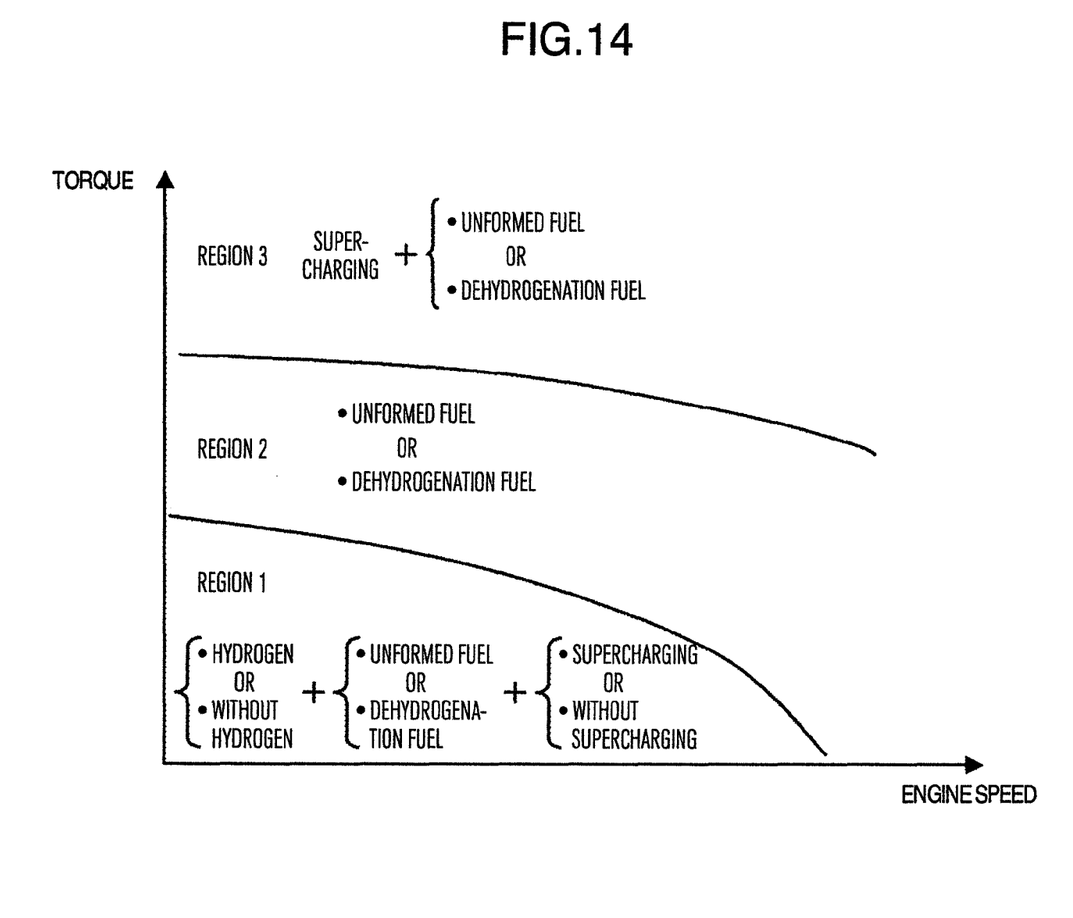
FIG. 14 shows a fuel supply map in the second embodiment.

FIG. 13 shows a control flow of this system. In S1301, the fuel supplied to the engine 1 is selected according to the operation conditions of the engine shown in FIG. 14. In this case, for the selection of the dehydrogenation fuel and the unreformed fuel, if the remaining amount of the dehydrogenation fuel is equal to or greater than a specified amount, the dehydrogenation fuel is selected, while if the remaining amount of the dehydrogenation fuel is less than the specified amount, the unreformed fuel is selected. Supercharging is performed in a high load range (region 3). Moreover, the supercharging is performed in an operation range with the torque equal to or greater than a predetermined torque where the operation is possible at the air excess ratio equal to or greater than 2 where NOx is not emitted in a region 1. In the supercharge operation range, the charging pressure may be varied according to the load. If the temperature of the reformer 2 is equal to or less than a predetermined temperature also in the region 1, supplying hydrogen to the engine is prohibited.

In S1302, the type, the supply amount, and the charging pressure of the fuel supplied to the engine 1 are determined. If hydrogen and dehydrogenation fuel are selected for the supply to the engine 1 in S1302, then hydrogen and dehydrogenation fuel are supplied to the engine 1 in S1303. From S1304, the supply amount of the unreformed fuel to the reformer 2 is controlled so that the supply pressure of hydrogen is within a predetermined range. In S1305, the ignition timing is determined according to the ignition map for dehydrogenation. Subsequently, in S1306, the ignition timing is corrected so that the heat generation beginning timing becomes a predetermined timing. The method of correcting the ignition timing is the same as the method in S207 and thereafter of FIG. 2.

If hydrogen and unreformed fuel are selected for the fuel supplied to the engine in S1302, hydrogen and unreformed fuel are supplied to the engine 1 in S1307. From S1308, the supply amount of the unreformed fuel to the reformer 2 is controlled so that the supply pressure of hydrogen is within a predetermined range. Because the octane number of the unreformed fuel is relatively low, the closing timing of the intake valve is delayed in S1309. This reduces the effective compression ratio, allowing for knocking prevention. At this time, the knocking prevention may be made by increasing the amount of EGR. Moreover, the system may be provided with a variable compression ratio mechanism so as to reduce the actual compression ratio. In S1310, the ignition timing is determined according to the ignition map for unreformed fuel. In S1311, the ignition timing is corrected so that the heat generation beginning timing becomes a predetermined timing. The method of correcting the ignition timing is the same as the method in S207 and thereafter of FIG. 2.

If the fuel supplied to the engine 1 is the dehydrogenation fuel in S1302, the dehydrogenation fuel is supplied to the engine in S1312. In S1313, the ignition timing is determined according to the ignition map for dehydrogenation fuel. If the fuel supplied to the engine 1 is the unreformed fuel in S1302, the unreformed fuel is supplied to the engine in S1314. In order to decrease the effective compression ratio for the purpose of preventing knocking, the closing timing of the intake valve is delayed in S1315. Moreover, the system may be provided with a variable compression ratio mechanism so as to reduce the actual compression ratio. In S1316, the ignition timing is determined according to the ignition map for unreformed fuel.

According to this system, by taking an anti-knocking measure in supplying the unreformed fuel to an engine against a fluctuation in the octane number in the fuel supplied to the engine, the compression ratio of the engine can be determined in accordance with a high-octane fuel and the heat efficiency can be improved.

The above description has been made with regard to the embodiments, but the present invention is not limited thereto, and it is apparent to those skilled in the art that various changes and modifications can be made within the spirit of the present invention and the scope of the attached claims.

REFERENCE SIGNS LIST 1 engine
2 reformer
3 exhaust pipe
4 throttle valve
5 intake pipe
6 fuel supply system for reformed fuel
7 fuel supply system for unreformed fuel
8 fuel supply system for unreformed fuel to reformer
9 intake valve
10 ignition plug
11 exhaust valve
12 unreformed fuel
13, 20 pressure sensor
14 rotational position detection device
15 $O_2$ sensor
16, 17 fuel supply system
18 compressor
19 selector valve
21 temperature sensor
22 EGR valve
23 controller
24 EGR pipe
25 separation unit
26 dehydrogenation fuel tank

The invention claimed is:

1. An engine system with a reformer, wherein an unreformed fuel is reformed by the reformer mounted in an exhaust pipe, and wherein a reformed fuel containing hydrogen is supplied to an engine, the engine system comprising a controller controlling an ignition timing of the engine, wherein
the controller, when the hydrogen generated by the reformer is supplied to the engine, determines a target heat generation beginning timing in accordance with a load applied to the engine, an engine speed, and an air excess ratio and controls an ignition timing of the engine so that a difference between a current heat generation beginning timing and the target heat generation beginning timing of the engine is within a predetermined range.

2. The engine system with a reformer according to claim 1, including data of a heat generation beginning timing in an optimum ignition timing corresponding to the engine torque, the engine speed, and an air excess ratio of an air-fuel mixture to the engine, and determining the target heat generation beginning timing from the data of the heat generation beginning timing.

3. The engine system with a reformer according to claim 1, further comprising:
a pressure measurement unit measuring a pressure inside the engine; and
a rotational position detection unit capable of measuring a rotational position of a crank of the engine, the engine system estimating the current heat generation beginning timing from a pressure measured by the pressure measurement unit and a crank position detected by the rotational position detection unit.

4. The engine system with a reformer according to claim 1, further comprising:
a hydrogen mixing ratio estimation unit estimating a hydrogen mixing ratio in fuel supplied to the engine from a crank angle from the ignition timing to the current heat generation beginning timing; and
an air excess ratio determination unit determining a target excess air ratio from the hydrogen mixing ratio estimated by the hydrogen mixing ratio estimation unit.

5. The engine system with a reformer according to claim 1, further comprising:
a separation unit separating the reformed fuel into a hydrogen gas and a dehydrogenation fuel;
a hydrogen gas supply unit supplying the hydrogen gas to the intake pipe of the engine;
a tank storing the dehydrogenation fuel; and
a dehydrogenation fuel supply unit directly injecting the dehydrogenation fuel into the engine.

6. The engine system with a reformer according to claim 5, wherein the dehydrogenation fuel has an octane number higher than the unreformed fuel.

7. The engine system with a reformer according to claim 6, further comprising a compressor for increasing an intake pressure of the intake pipe of the engine.

8. The engine system with a reformer according to claim 6, further comprising the controller which, when a stored amount of the dehydrogenation fuel is equal to or less than a specified amount, stops a supply of the dehydrogenation fuel to the engine and supplies the unreformed fuel to the engine, and which, before switching the fuel supplied to the engine from the dehydrogenation fuel to the unreformed fuel, performs either one of reducing a compression ratio, or controlling a closing timing of the intake valve of the engine, or increasing an amount of an exhaust gas of the engine returning to the engine.

* * * * *